(12) United States Patent
Sawai et al.

(10) Patent No.: US 8,064,502 B2
(45) Date of Patent: Nov. 22, 2011

(54) WIRELESS COMMUNICATION APPARATUS, WIRELESS COMMUNICATION METHOD, AND COMPUTER PROGRAM

(75) Inventors: Ryou Sawai, Tokyo (JP); Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 344 days.

(21) Appl. No.: 12/477,573

(22) Filed: Jun. 3, 2009

(65) Prior Publication Data
US 2010/0008406 A1 Jan. 14, 2010

(30) Foreign Application Priority Data

Jul. 14, 2008 (JP) ................................ 2008-182792

(51) Int. Cl.
*H04B 1/38* (2006.01)
*H04L 5/16* (2006.01)

(52) U.S. Cl. ........ 375/219; 375/267; 375/295; 375/347; 375/349; 455/101; 455/103; 455/500; 455/526

(58) Field of Classification Search .................. 375/219, 375/267, 295, 347, 349; 455/101, 103, 500, 455/526
See application file for complete search history.

(56) References Cited

U.S. PATENT DOCUMENTS

| 6,339,399 | B1 * | 1/2002 | Andersson et al. ........... 342/372 |
| 2005/0095996 | A1 | 5/2005 | Takano |
| 2006/0292990 | A1 * | 12/2006 | Karabinis et al. ............ 455/63.4 |
| 2007/0224943 | A1 | 9/2007 | Gu et al. |

FOREIGN PATENT DOCUMENTS

| JP | 2000-216618 | 8/2000 |
| JP | 2004-260588 | 9/2004 |
| JP | 2005-160030 | 6/2005 |
| JP | 2006-19992 | 1/2006 |
| JP | 2006-279590 | 10/2006 |
| JP | 2006-279905 | 10/2006 |
| JP | 2007-116414 | 5/2007 |
| JP | 2008-154244 | 7/2008 |
| JP | 2009-530873 | 8/2009 |

OTHER PUBLICATIONS

U.S. Appl. No. 12/556,971, filed Sep. 10, 2009, Sawai.
Keiichi Mizutani, et al., "Performance Comparison between Feedback and Feedback-less Method to obtain CSIT in Multi-user MIMO Procdeding", Institute of Electronics, Information and Communication Engineers technology memoir, vol. 107, No. 518, Feb. 27, 2008, FCS2007-242, pp. 335-340, (plus two cover pages).

* cited by examiner

*Primary Examiner* — Curtis Odom
(74) *Attorney, Agent, or Firm* — Oblon, Spivak, McClelland, Maier & Neustadt, L.L.P.

(57) ABSTRACT

A wireless communication apparatus compensates for phase and amplitude imbalances existing among transmit and receive branches, while also preventing likelihood information and SNR estimation error produced by such imbalance compensation. In an apparatus having a plurality of transmit and receive antennas and respective branches for each antenna, a calibration processor multiplies receive signals in each receive branch by antenna calibration coefficients, in order to correct phase and amplitude imbalances existing among the receive branches. A transmit beamforming matrix estimator then estimates a transmit beamforming matrix by using the multiplied receive signals. An estimator then solves for estimated values such as the noise power, likelihood information, and channel waveform equalization values for each receive branch, and in addition, derives a final estimated value that takes the multiplication by correction coefficients into account when averaging the estimated values for each receive branch or when computing a weighted average according to likelihood.

12 Claims, 10 Drawing Sheets

WIRELESS COMMUNICATION APPARATUS, WIRELESS COMMUNICATION METHOD, AND COMPUTER PROGRAM

BACKGROUND OF THE INVENTION

1. Field of the Invention

The present invention relates to a wireless communication apparatus, a wireless communication method, and a computer program whereby data is communicated with increased transmission capacity by means of a spatial multiplexing (MIMO) communication technique using paired transmitters having a plurality of antennas each. More particularly, the present invention relates to a wireless communication apparatus, a wireless communication method, and a computer program whereby spatially multiplexed communication is conducted by compensating for phase and amplitude imbalances existing among transmit and receive branches, and thereby obtaining a suitable channel matrix.

2. Description of the Related Art

Wireless networks are now the subject of much attention, being systems free from the wiring involved in wired communication methods of the past. Specifications such as IEEE 802.11 (Institute of Electrical and Electronics Engineers 802.11) and IEEE 802.15 are recognized standards for wireless networks. For example, in IEEE 802.11a/g, a type of multi-carrier modulation method known as orthogonal frequency division multiplexing (OFDM) is implemented as the standard wireless LAN specification.

In addition, although the IEEE 802.11a/g standard supports modulation methods that can achieve a maximum data transfer rate of 54 Mbps, there is demand for a next-generation wireless LAN standard able to realize even greater bit rates. Multi-Input Multi-Output, or MIMO, is receiving attention as one technology for realizing faster wireless communication, and a MIMO-OFDM communication method has been adopted in IEEE 802.11n, an amendment to the IEEE 802.11 standard.

MIMO is a communication method that realizes a spatially multiplexed stream by providing a plurality of antenna elements at both the transmitter and the receiver. On the transmit side, a plurality of transmit data is multiplexed by performing space-time coding, distributed across a plurality of transmit antennas, and then transmitted on a channel. Likewise, on the receive side, a receive signal received by a plurality of receive antennas via the channel is separated into the plurality of transmit data by performing space-time decoding. Thus, the original data can be obtained without inter-stream cross-talk. By means of a MIMO communication method, the transmission capacity can be increased in accordance with the number of antennas, and without increasing the frequency band. As a result, an improved data transfer rate can be achieved. Furthermore, since spatial multiplexing is used, frequency utilization efficiency is also favorable. MIMO is a communication method that takes advantage of channel characteristics, and is thus different from a simple adaptive array.

In MIMO communication, a channel matrix H is used to respectively calculate a transmit weight matrix and a receive weight matrix, for example. The transmit weight matrix is used to spatially multiplex a transmit stream from a plurality of transmit branches on the transmit side. The receive weight matrix is used to spatially separate a spatially multiplexed signal into a plurality of streams at the receive side. The channel matrix H is a numeric matrix whose elements are channel information corresponding to transmit and receive antenna pairs. The channel information referred to herein is made up of transfer coefficients having phase and amplitude components. Normally, the channel matrix can be estimated by carrying out a frame exchange sequence containing a training sequence made up of pre-defined reference symbols for exciting the channel matrix between the transmitter and receiver.

It has been established that by setting the channel matrix H equal to the singular value decomposition (SVD) $UDV^H$ (in other words, by taking $H=UDV^H$), the transmit beamforming matrix V and the receive weight matrix UH are obtained. For example, proposals have been regarding a wireless communication system wherein the quantity of feedback information sent from the receive side to the transmit side is compressed. Instead of feeding back the transmit beamforming matrix V obtained by taking the SVD of channel information matrix acquired at the receive side, packets containing the training sequence are transmitted from the receive side to the transmit side, and the transmit beamforming matrix V is thus also obtained by SVD on the transmit side (see Japanese Unexamined Patent Application Publication No. 2005-160030, paragraph 0045, for example).

Meanwhile, in multi-antenna communication using a plurality of transmit and receive antennas (as typified by MIMO and adaptive arrays), there exist imbalances in the transfer coefficients (i.e., the phase and amplitude) among the transmit and receive branches. In the digital processor on the receive side, the combination of the spatial transfer coefficients and the transfer coefficients in the analog unit within the apparatus are recognized as channels, and thus branch imbalances in the analog unit can lead to channel misrecognition. For this reason, in order to obtain an accurate channel matrix and realize optimal beamforming, the training sequence used for channel estimation that is exchanged between the transmitter and receiver is multiplied by calibration coefficients to correct phase and amplitude imbalances.

For example, proposals have been made regarding a wireless communication system that conducts the following. Calibration coefficients are first found for each antenna at both the transmitter and receiver. Then, when feeding back the reference signal feedback and solving for the transfer coefficients on the basis of the reference signal, the system is calibrated using the calibration coefficients for the receive antennas as well as the calibration coefficients for the transmit antennas, respectively. As a result of such calibration, mismatches in the channel information matrix in the forward and reverse directions are corrected (see Japanese Unexamined Patent Application Publication No. 2005-160030, paragraph 0052, for example).

It is also thought that antenna calibration should be conducted at the receiver rather than the transmitter. This is because the calibration coefficients are based on branches with large output in order to accommodate the transmit spectral mask when the transmit signal is multiplied by calibration correction coefficients and transmitted. If there are large fluctuations in the gain in each transmit branch, then the power loss accompanying the multiplication by the calibration coefficients also becomes large, resulting in degradation in the characteristics of RF circuit chips, where fluctuations are small.

Consequently, when a MIMO communication device receives a frame containing a training sequence for exciting the channel matrix, training sequence portions in respective receive branches are respectively multiplied by calibration coefficients to correct phase and amplitude imbalances.

Meanwhile, on the receive side of the wireless communication, the noise contained in the receive signal (i.e., the signal-to-noise ratio, or SNR) is estimated. The SNR is estimated in order to conduct efficient transmission by switching to more suitable modulation and coding methods or data transfer rates on the basis of communication quality, as represented by quantities such as the estimated SNR. In addition, soft decision decoding techniques estimate the receive bit sequence by conducting maximum likelihood sequence estimation using deinterleave processing and Viterbi decoding. With such soft decision decoding techniques, some kind of likelihood information is provided to the decoder, with the likelihood information being solved for on the basis of the noise power. For this reason, there is concern that decoding performance will degrade if the noise estimation is poor.

However, when respectively multiplying the receive signals in each receive branch by calibration coefficients in order to compensate for phase and amplitude imbalances existing among transmit and receive branches as described above, the above corresponds to invalid gain being applied among branches. For this reason, in a system that conducts antenna calibration on the receive side, the occurrence of errors in the estimation of the SNR and the likelihood information performed when calibrating is dependent on the noise estimation method, leading to concerns regarding the degradation of reception characteristics.

SUMMARY OF THE INVENTION

Given the above, it is desirable to provide a wireless communication apparatus, a wireless communication method, and a computer program able to optimally communicate data with increased transmission capacity by means of a spatial multiplexing (MIMO) communication technique using paired transmitters having a plurality of antennas each.

It is furthermore desirable to provide a wireless communication apparatus, a wireless communication method, and a computer program able to conduct spatially multiplexed communication by compensating for phase and amplitude imbalances existing between transmit and receive branches, and thereby obtaining a suitable channel matrix.

It is furthermore desirable to provide a wireless communication apparatus, a wireless communication method, and a computer program able to compensate for phase and amplitude imbalances existing between transmit and receive branches, while additionally preventing errors in the estimation of likelihood information and SNR that occur as a result of multiplying by calibration coefficients in order to compensate for such imbalances.

MIMO is one established technology for realizing faster wireless communication, wherein spatially multiplexed signals are transmitted between communication devices provided with a plurality of antennas. Using MIMO, it is possible to increase the transmission capacity in accordance with the number of antennas, improving both the data transfer rate and the frequency utilization efficiency. On the transmit side, a transmit beamforming matrix V obtained from the channel matrix is used to spatially multiplex a plurality of transmit streams.

Meanwhile, since there exist imbalances in the transfer coefficients (i.e., the phase and amplitude) among the transmit and receive branches in multi-antenna communication, antenna calibration is performed in order to correct such imbalances. Moreover, in order to avoid unwanted power loss, it is preferable to perform antenna calibration at the receiver rather than the transmitter.

For this reason, in order to obtain a suitable transmit beamforming matrix, communication devices conducting MIMO communication multiply a channel estimation training sequence exchanged between the transmitter and receiver by calibration coefficients to correct phase and amplitude imbalances.

However, if imbalance correction is continuously applied at the receive side, then invalid gain is applied among the receive branches. This results in errors in the estimation of noise and likelihood information, and leads to concerns regarding the degradation of reception characteristics.

A wireless communication apparatus in accordance with a first embodiment of the present invention includes: a plurality of transmit antennas and receive antennas; a transmit branch for each transmit antenna as well as a receive branch for each receive antenna; a calibration processor configured to multiply receive signals in each receive branch by antenna calibration coefficients, in order to correct phase and amplitude imbalances existing among the receive branches; a transmit beamforming matrix estimator configured to estimate a transmit beamforming matrix by using the respective receive signals that were multiplied by the antenna calibration coefficients by the calibration processor; and an estimator configured to estimate the noise power, likelihood information, and channel waveform equalization values for each receive branch or other estimated values, and in addition, to derive a final estimated value (X) that takes the multiplication by correction coefficients into account when averaging the estimated values for each receive branch or when computing a weighted average according to likelihood.

In the wireless communication apparatus in accordance with the first embodiment of the present invention, imbalance correction for the receive branches is continuously carried out to account for the unknown time at which the training sequence for exciting the channel matrix arrives. However, in order to prevent error in the estimated values (i.e., the channel waveform equalization values, the noise power estimations, and the likelihood information) found before and after execution of imbalance correction by the calibration processor, a final estimated value (X) that takes the multiplication by correction coefficients into account is derived when averaging the estimated values $(x_0, x_1, \ldots, x_n)$ for each receive branch or when computing a weighted average according to likelihood.

A wireless communication apparatus in accordance with a second embodiment of the present invention includes: a plurality of transmit antennas and receive antennas; a transmit branch for each transmit antenna as well as a receive branch for each receive antenna; a calibration processor configured to multiply receive signals in each receive branch by antenna calibration coefficients, in order to correct phase and amplitude imbalances existing among the receive branches; a channel matrix estimator configured to estimate a first channel matrix by using respective receive signals multiplied by the antenna calibration coefficients by the calibration processor, as well as to estimate a second channel matrix by using respective receive signals not multiplied by the antenna calibration coefficients by the calibration processor; a transmit beamforming matrix estimator configured to estimate a transmit beamforming matrix by using the first channel matrix; and an estimator configured to use the second channel matrix to estimate the noise power, likelihood information, and channel waveform equalization values for each receive branch, or conduct other processing.

In the wireless communication apparatus in accordance with the second embodiment, a suitable transmit beamforming matrix can be estimated using a first channel matrix, which is itself estimated using respective receive signals multiplied by antenna calibration coefficients. In addition, other estimation processing can be carried out without error, using a second channel matrix estimated using receive signals not multiplied by antenna calibration coefficients (in other words, receive signals to which invalid gain has not been applied).

A wireless communication apparatus in accordance with a third embodiment of the present invention includes: a plurality of transmit antennas and receive antennas; a transmit branch for each transmit antenna as well as a receive branch for each receive antenna; a calibration processor configured to multiply receive signals in each receive branch by antenna calibration coefficients, in order to correct phase and amplitude imbalances existing among the receive branches; a controller configured to ascertain the frame exchange sequence being carried out with the communication partner, and conduct control such that the calibration processor performs antenna calibration only when the apparatus is standing by to receive a packet used for antenna calibration; a channel matrix estimator configured to estimate a channel matrix by using respective receive signals; a transmit beamforming matrix estimator configured to estimate a transmit beamforming matrix by using the channel matrix; and an estimator configured to use the channel matrix to estimate the noise power, likelihood information, and channel waveform equalization values for each receive branch, or conduct other processing.

The wireless communication apparatus in accordance with the third embodiment of the present invention is configured to conduct antenna calibration only when standing by to receive a packet used for antenna calibration. In other words, various estimation processing can be conducted using receive signals to which invalid gain has not been applied, thereby curtailing estimation error.

A wireless communication apparatus in accordance with a fourth embodiment of the present invention is configured such that the controller itself controls the response packet transmit opportunity in order to obtain a channel matrix H used to estimate a transmit beamforming matrix.

More specifically, when a wireless communication apparatus in accordance with a fifth embodiment of the present invention is in a receive standby state after requesting the communication partner for transmission of a frame containing a training sequence for exciting the channel matrix, the controller issues instructions such that the calibration processor conducts antenna calibration. Consequently, a suitable transmit beamforming matrix V can be obtained as a result of imbalance correction. In addition, since a channel matrix H obtained without applying invalid gain is used to estimate likelihood information and other quantities during periods other than when the channel matrix is estimated in order to obtain the transmit beamforming matrix V, errors in the estimation of the likelihood information is curtailed.

When a wireless communication apparatus in accordance with a sixth embodiment of the present invention carries out link adaptation and is in a receive standby state after receiving a link adaptation feedback request from the communication partner, the controller issues instructions such that the calibration processor conducts antenna calibration. As a result, suitable link adaptation can be carried out using receive signals corrected for phase and amplitude imbalances. In addition, since a channel matrix H obtained without applying invalid gain is used to estimate likelihood information and other quantities during periods other than the above, errors in the estimation of the likelihood information is curtailed.

A wireless communication method in accordance with a seventh embodiment of the present invention is implemented in a wireless communication apparatus provided with a plurality of transmit antennas and receive antennas, a transmit branch for each transmit antenna, as well as a receive branch for each receive antenna. The wireless communication method includes the steps of: calibrating by multiplying the receive signals in each receive branch by antenna calibration coefficients in order to correct phase and amplitude imbalances existing among the receive branches; estimating a transmit beamforming matrix by using the respective receive signals multiplied by the antenna calibration coefficients in the calibrating step; and estimating by solving for the noise power, likelihood information, and channel waveform equalization values for each receive branch or other estimated values, and in addition, deriving a final estimated value (X) that takes the multiplication by correction coefficients into account when averaging the estimated values for each receive branch or when computing a weighted average according to likelihood.

A wireless communication method in accordance with an eighth embodiment of the present invention is implemented in a wireless communication apparatus provided with a plurality of transmit antennas and receive antennas, a transmit branch for each transmit antenna, as well as a receive branch for each receive antenna. The wireless communication method includes the steps of: calibrating by multiplying the receive signals in each receive branch by antenna calibration coefficients in order to correct phase and amplitude imbalances existing among the receive branches; estimating a first channel matrix by using respective receive signals that were multiplied by the antenna calibration coefficients in the calibrating step; estimating a second channel matrix by using respective receive signals not multiplied by the antenna calibration coefficients in the calibrating step; estimating a transmit beamforming matrix by using the first channel matrix; and estimating the noise power, likelihood information, and channel waveform equalization values for each receive branch, or conducting other processing, using the second channel matrix.

A wireless communication method in accordance with a ninth embodiment of the present invention is implemented in a wireless communication apparatus provided with a plurality of transmit antennas and receive antennas, a transmit branch for each transmit antenna, as well as a receive branch for each receive antenna. The wireless communication method includes the steps of: calibrating by multiplying receive signals in each receive branch by antenna calibration coefficients, in order to correct phase and amplitude imbalances existing among the receive branches, wherein the calibrating is only conducted when the apparatus is standing by to receive a packet used for antenna calibration; estimating a channel matrix by using respective receive signals; estimating a transmit beamforming matrix by using the channel matrix; and estimating the noise power, likelihood information, and channel waveform equalization values for each receive branch, or conducting other processing, using the channel matrix.

A computer program in accordance with a tenth embodiment of the present invention is stated in a computer-readable format so as to cause the execution of processing, on a computer, in a wireless communication apparatus provided with a plurality of transmit antennas and receive antennas, a transmit branch for each transmit antenna, as well as a receive branch for each receive antenna. The computer program causes the computer to execute the steps of: calibrating by multiplying the receive signals in each receive branch by antenna calibration coefficients in order to correct phase and amplitude imbalances existing among the receive branches; estimating a transmit beamforming matrix by using the respective receive signals multiplied by the antenna calibration coefficients in the calibrating step; and estimating by solving for the noise power, likelihood information, and channel waveform equalization values for each receive branch or other estimated values, and in addition, deriving a final estimated value that takes the multiplication by correction coefficients into account when averaging the estimated values for each receive branch or when computing a weighted average according to likelihood.

A computer program in accordance with an eleventh embodiment of the present invention is stated in a computer-readable format so as to cause the execution of processing, on a computer, in a wireless communication apparatus provided with a plurality of transmit antennas and receive antennas, a transmit branch for each transmit antenna, as well as a receive branch for each receive antenna. The computer program causes the computer to execute the steps of: calibrating by multiplying the receive signals in each receive branch by antenna calibration coefficients in order to correct phase and amplitude imbalances existing among the receive branches; estimating a first channel matrix by using respective receive signals that were multiplied by the antenna calibration coefficients in the calibrating step; estimating a second channel matrix by using respective receive signals not multiplied by the antenna calibration coefficients in the calibrating step; estimating a transmit beamforming matrix by using the first channel matrix; and estimating the noise power, likelihood information, and channel waveform equalization values for each receive branch, or conducting other processing, using the second channel matrix.

A computer program in accordance with a twelfth embodiment of the present invention is stated in a computer-readable format so as to cause the execution of processing, on a computer, in a wireless communication apparatus provided with a plurality of transmit antennas and receive antennas, a transmit branch for each transmit antenna, as well as a receive branch for each receive antenna. The computer program causes the computer to execute the steps of: calibrating by multiplying receive signals in each receive branch by antenna calibration coefficients, in order to correct phase and amplitude imbalances existing among the receive branches, wherein the calibrating is only conducted when the apparatus is standing by to receive a packet used for antenna calibration; estimating a channel matrix by using respective receive signals; estimating a transmit beamforming matrix by using the channel matrix; and estimating the noise power, likelihood information, and channel waveform equalization values for each receive branch, or conducting other processing, using the channel matrix.

Herein, the computer programs in accordance with the tenth to the twelfth embodiments of the present invention are defined to be computer programs stated in a computer-readable format such that predetermined processing is realized on a computer. In other words, by installing computer programs in accordance with the tenth to the twelfth embodiments onto a computer, cooperative action is exhibited on the computer, and operational advantages are obtained similar to those of the wireless communication apparatus in accordance with the first to the third embodiments of the present invention.

According to the first, seventh, and tenth embodiments of the present invention, a wireless communication apparatus that conducts MIMO communication continuously carries out imbalance correction for the receive branches to account for the unknown timing at which the training sequence for exciting the channel matrix arrives. However, the embodiments are also configured to prevent error in the estimated values (i.e., the channel waveform equalization values, the noise power estimations, and the likelihood information) found before and after execution of imbalance correction by a calibration processor.

According to the second, eighth, and eleventh embodiments of the present invention, a wireless communication apparatus that conducts MIMO communication estimates a suitable transmit beamforming matrix by using a first channel matrix, which is itself estimated using respective receive signals multiplied by antenna calibration coefficients. In addition, other estimation processing can be carried out without error, using a second channel matrix estimated using receive signals not multiplied by antenna calibration coefficients (in other words, receive signals to which invalid gain has not been applied).

According to the third, ninth, and twelfth embodiments of the present invention, a wireless communication apparatus that conducts MIMO communication estimates a suitable transmit beamforming matrix by using receive signals that have been corrected by antenna calibration. In addition, various estimation processing can also be conducted using receive signals to which invalid gain has not been applied, thereby curtailing estimation error.

Further features and advantages of the present invention will become apparent upon reading of the following detailed description of exemplary embodiments in conjunction with the attached drawings.

DESCRIPTION OF THE PREFERRED EMBODIMENTS

Hereinafter, embodiments of the present invention will be described in detail and with reference to the accompanying drawings.

MIMO is a communication method that realizes a spatially multiplexed stream by providing a plurality of antenna elements at both the transmitter and the receiver. On the transmit side, a plurality of transmit data is multiplexed by performing space-time coding, distributed across a plurality of transmit antennas, and then transmitted on a channel. Likewise, on the receive side, a receive signal received by a plurality of receive antennas via the channel is separated into the plurality of transmit data by performing space-time decoding. Thus, the original data can be obtained without inter-stream cross-talk. By means of a MIMO communication method, the transmission capacity can be increased in accordance with the number of antennas, and without increasing the frequency band. As a result, an improved data transfer rate can be achieved.

Figure 1:
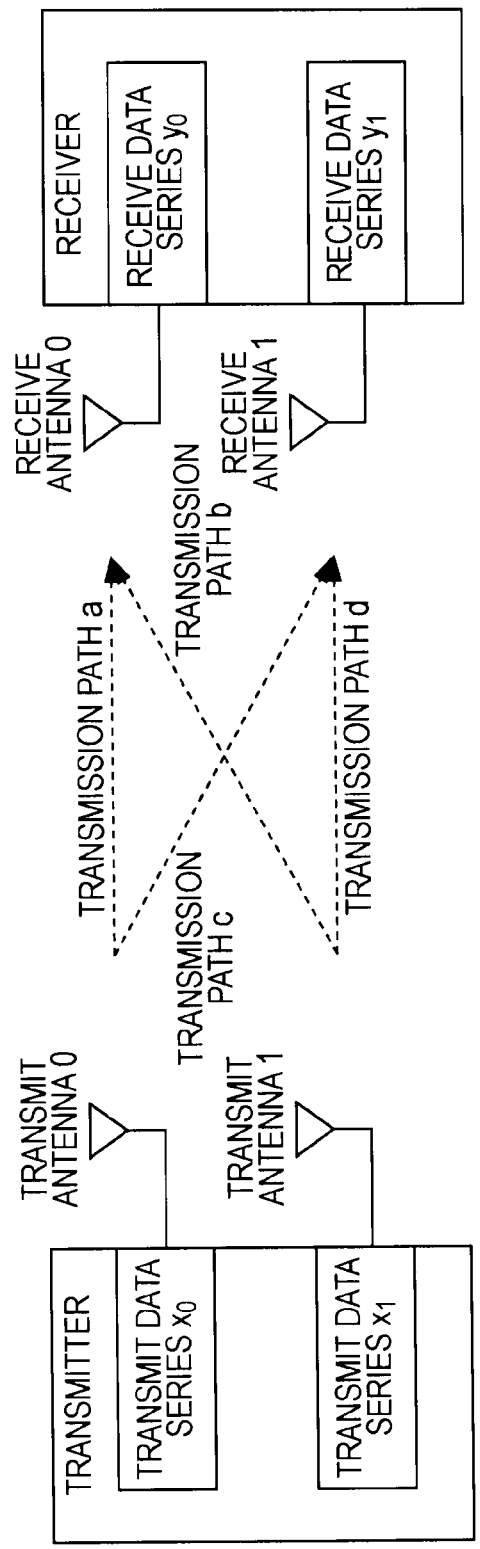
FIG. 1 is a diagram schematically illustrating a MIMO communication system.

FIG. 1 schematically illustrates a MIMO communication system. The system shown in FIG. 1 has a 2-stream, 2×2 architecture by way of example. The MIMO transmitter is provided with two antennas: a transmit antenna 0 and a transmit antenna 1. Likewise, the MIMO receiver is provided with a receive antenna 0 and a receive antenna 1. Herein, the transmission path between the transmit antenna 0 and the receive antenna 0 is taken to be the transmission path a, the transmission path between the transmit antenna 1 and the receive antenna 0 is taken to be the transmission path b, the transmission path between the transmit antenna 0 and the receive antenna 1 is taken to be the transmission path c, and the transmission path between the transmit antenna 1 and the receive antenna 1 is taken to be the transmission path d. Furthermore, the transmitter respectively allocates a transmit data sequence $x_0$ to the transmit antenna 0, and a transmit data sequence $x_1$ to the transmit antenna 1. The receiver then respectively receives a receive data sequence $y_0$ at the receive antenna 0, and receives a receive data sequence $y_1$ at the receive antenna 1. The transmission path conditions in this case can be expressed as $$y = H \cdot x + n \quad (1)$$
$$y = \begin{bmatrix} y_0 \\ y_1 \end{bmatrix},$$
$$H = \begin{bmatrix} a & b \\ c & d \end{bmatrix},$$
$$x = \begin{bmatrix} x_0 \\ x_1 \end{bmatrix}$$

wherein y, H, x, and n are the receive signals, the channel matrix, the transmit signals, and the noise component, respectively.

FIG. 1 illustrates the case wherein two transmit antennas and two receive antennas are provided. However, a MIMO communication system can be similarly established as long as there are two or more antennas. On the transmit side, a plurality of transmit data is multiplexed by performing space-time coding, distributed across M transmit antennas, and then transmitted on a MIMO channel. Meanwhile, on the receive side, receive data is obtained by space-time decoding a receive signal received by N receive antennas via the MIMO channel. Ideally, the number of MIMO streams formed is equal to the lesser of the numbers of transmit and receive antennas (i.e., MIN[M,N]).

Normally, a predefined training sequence for exciting the channel matrix is exchanged between the transmitter and the receiver. A transfer function is then estimated using the differences between the predefined sequence and the signal that is actually received. A channel matrix H can then be constructed by arraying the transfers for the paths formed by combinations of transmit and receive antennas in a matrix format. Given N antennas on the transmit side and M antennas on the receive side, the channel matrix becomes an M×N (row×column) matrix. Other matrices can be subsequently obtained on the basis of the estimated channel matrix, such as a transmit weight matrix for spatially multiplexing transmit streams from a plurality of transmit branches at the transmitter, and a receive weight matrix for spatially separating a spatially multiplexed signal into a plurality of streams at the receiver.

For example, SVD (as described earlier), eigenvalue decomposition (EVD), or another matrix decomposition technique may be applied to the channel matrix H to obtain a transmit beamforming matrix V (as described earlier) used to conduct beamforming, wherein weights are assigned to each transmit antennas at the time of transmission.

In addition, comparatively simpler algorithms for using the channel matrix H to derive a receive weight matrix for spatially separating a receive signal include the following: zero-forcing, wherein the inverse matrix $H^{-1}$ of the channel matrix H is simply used for the receive weight matrix, on the basis of the logic that cross-talk has been completely eliminated; and the minimum mean square error (MMSE) receive method, wherein a receive weight matrix W is computed from the channel matrix H on the basis of the logic that the ratio of signal power versus square error (i.e., the sum of the cross-talk power and the noise power), or SNR, is maximized. The MMSE algorithm introduces the concept of receiver noise power, and solves for the receive weight matrix W by deliberately producing cross-talk. In noisy environments, MMSE performs better than zero-forcing.

Maximum likelihood detection (MLD) is one example of another algorithm for spatially separating a spatially multiplexed receive signal, wherein the most likely transmit sequence is estimated by matching with all conceivable transmit signal sequences. Although MLD is the highest-performing receive method, there is a problem in that the computational scale is large and implementation is difficult.

For example, in IEEE 802.11 infrastructure mode, an access point (AP) becomes the transmitter that conducts transmit beamforming and transmits a spatially multiplexed signal, while a client station (STA) becomes the receiver that spatially separates a received, spatially multiplexed signal. In other words, the AP becomes the beamformer, and the STA becomes the beamformee.

In addition, there exist implicit feedback and explicit feedback frame exchange sequences for feeding back information related the channel matrix between the above transmitter and receiver.

With implicit feedback, the transmitter estimates the channel matrix in the reverse direction from the receiver to the transmitter, using the training sequence sent from the receiver. It is assumed that the channel characteristics are reciprocal for both directions between the transmitter and receiver, and thus the transmitter subsequently calculates a channel matrix in the forward direction from the transmitter to the receiver, and then conducts beamforming.

In a frame exchange sequence using implicit feedback, the beamformer first issues a training request (TRQ) requesting transmission of a training sequence. In response, the beamformee replies with a frame containing a training sequence for exciting the channel matrix. Subsequently, the beamformer estimates the channel matrix for each receive branch on the basis of the training sequence, and additionally calculates a transmit beamforming matrix V by using SVD or another matrix decomposition technique.

Explicit feedback is a frame exchange sequence wherein the beamformer receives explicit feedback regarding the estimated channel matrix from the beamformee, and thus can be conducted without assuming that the channel is reciprocal. The formats of the feedback regarding the estimated channel matrix are broadly classified into the following cases: sending MIMO channel coefficients, and sending a transmit weight matrix V used for beamforming that is calculated by the beamformee. The former format is referred to as channel state information (CSI). The beamformer assembles a channel matrix H from received CSI, and then uses a matrix decomposition technique to itself calculate the transmit weight matrix V used for beamforming. The latter format is further broadly classified into the following cases: sending the transmit weight matrix V for beamforming in an uncompressed state, and sending the transmit weight matrix V for beamforming in a compressed state.

In a frame exchange sequence using explicit feedback, the beamformer initiates the sequence by transmitting a frame containing a CSI feedback request. The request frame also contains a training sequence for exciting the channel matrix. In response, the beamformee estimates the channel matrix from the training sequence for each receive branch, collects the CSI, and then replies with the CSI data itself contained in a packet as a CSI feedback (CFB) message. Subsequently, the beamformer calculates the transmit beamforming matrix V from the received CFB.

As described earlier, in multi-antenna communication using a plurality of transmit and receive antennas, there exist imbalances in the transfer coefficients (i.e., the phase and amplitude) among the transmit and receive branches. For this reason, in order to obtain an accurate channel matrix and realize optimal beamforming, antenna calibration is conducted with respect to training sequence portions used for channel estimation in order to compensate for phase and amplitude imbalances.

For example, consider a communication system having n transmit and receive branches, wherein i is the branch number, and $T_x(i)$ and $R_x(i)$ are the respective gains for the transmit branch and receive branch belonging to the ith branch. Given the above, the goal of calibration is to solve for per-branch calibration coefficients C(i) whereby the relationship $$\frac{T_x(0)}{R_x(0)} = \frac{T_x(1)}{R_x(1)} = \ldots = \frac{T_x(n)}{R_x(n)} \quad (2)$$

is established.

In other words, the goal of calibration is not to solve for calibration coefficients C(i) whereby the relationship $$T_x(0) \cdot C(0) = T_x(1) \cdot C(1) = \ldots = T_x(n) \cdot C(n)$$

$$R_x(0) \cdot C(0) = R_x(1) \cdot C(1) = \ldots = R_x(n) \cdot C(n) \quad (3)$$

is established.

It is also thought that antenna calibration should be conducted at the receiver rather than the transmitter. This is because the calibration coefficients are based on branches with large output in order to accommodate the transmit spectral mask when the transmit signal is multiplied by calibration correction coefficients and transmitted. If there are large fluctuations in the gain in each transmit branch, then the power loss accompanying the multiplication by the calibration coefficients also becomes large, resulting in degradation in the characteristics of RF circuit chips, where fluctuations are small. Typically, calibration is performed in the frequency domain after FFT processing. Consequently, the calibration coefficients C(i) for each sub-carrier are multiplied in the frequency domain.

Figure 2:
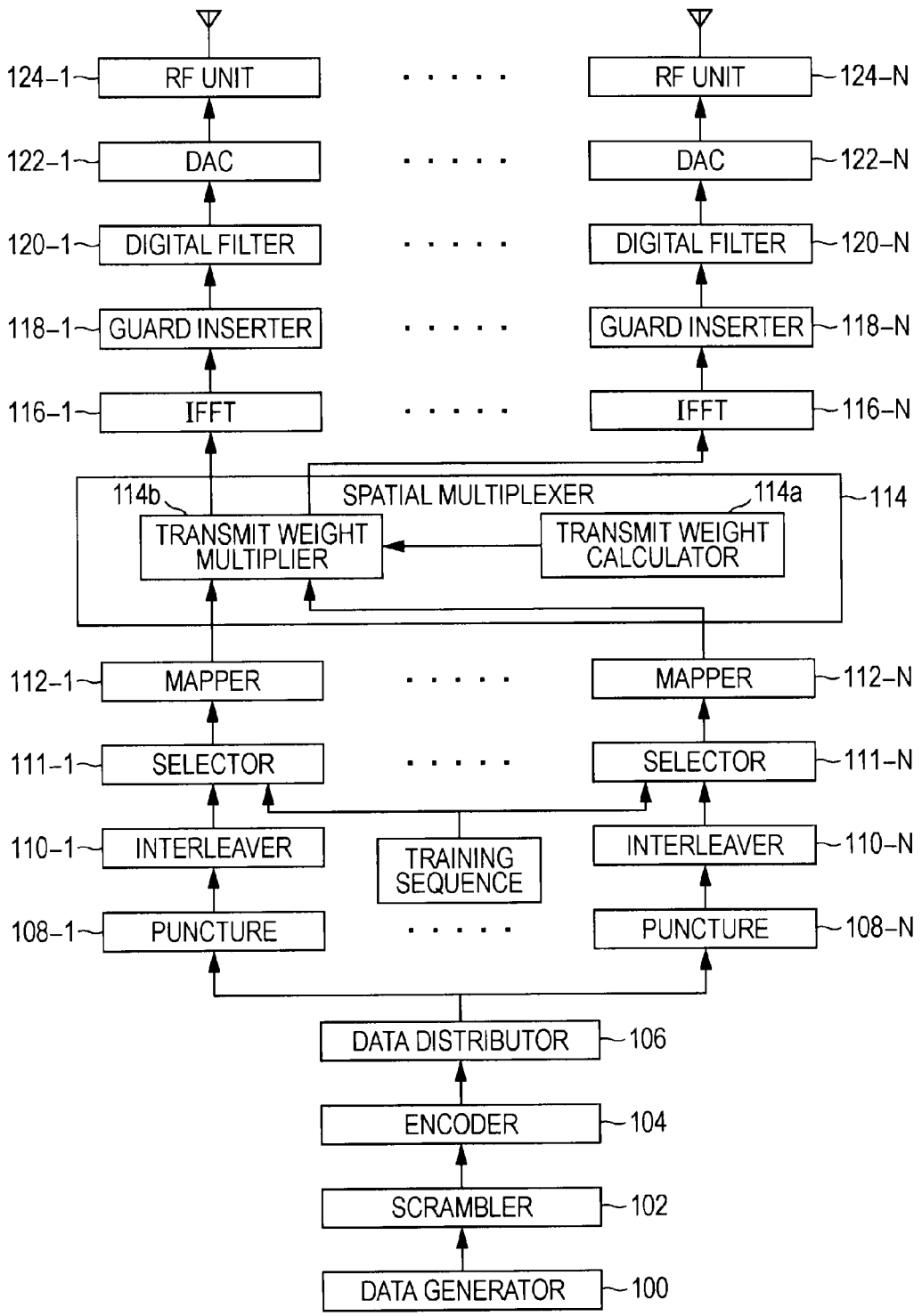
FIG. 2 illustrates an exemplary configuration of a MIMO transmitter.
Figure 3:
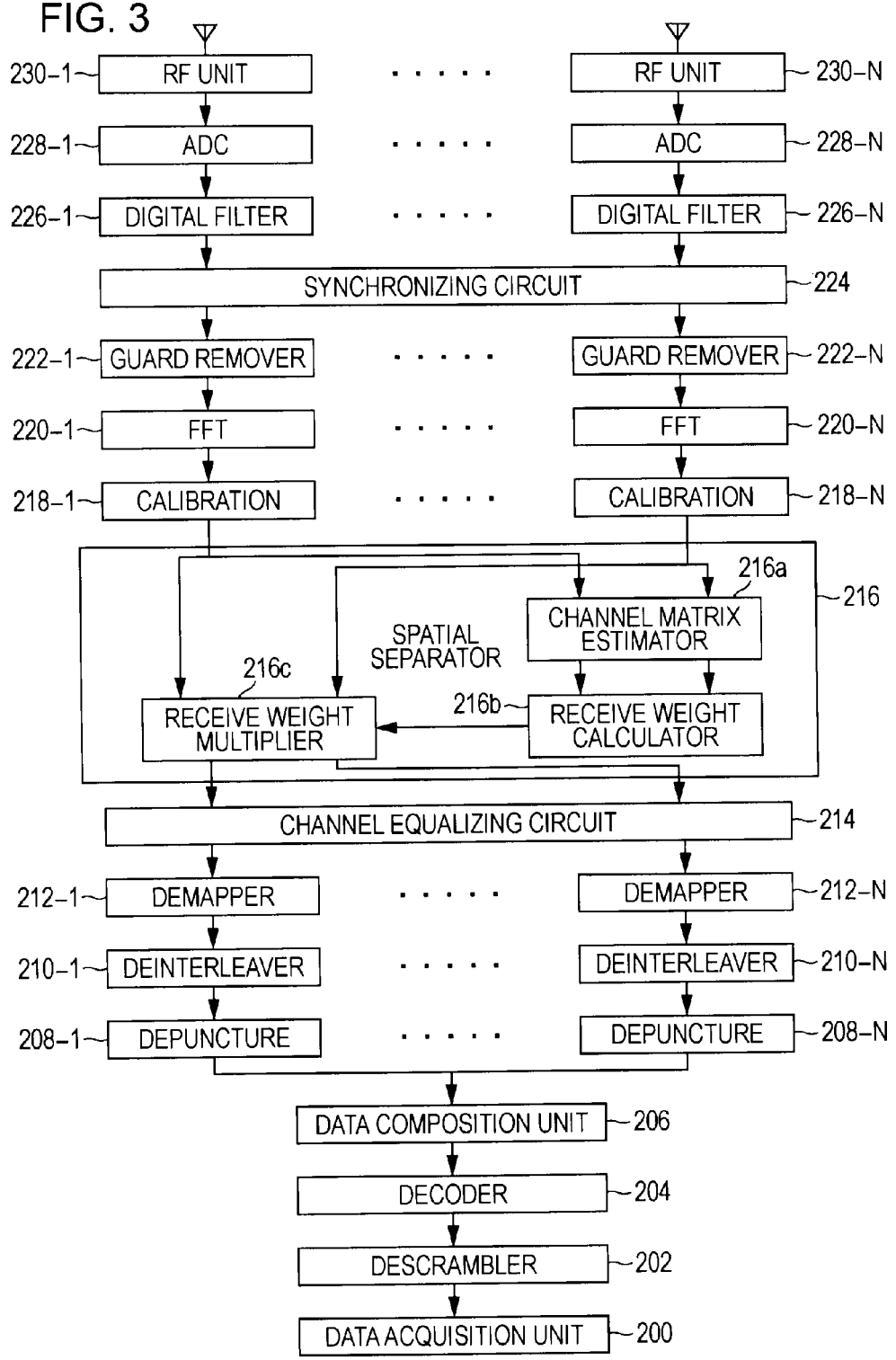
FIG. 3 illustrates an exemplary configuration of a MIMO receiver.

FIGS. 2 and 3 respectively illustrate exemplary configurations of a transmitter and a receiver constituting a communication apparatus that conducts MIMO communication.

In FIG. 2, the number of antennas in the transmitter (or in other words, the number of transmit branches) is N. Although the IEEE-compliant maximum of N is 4, for example, only two antenna branches are illustrated in FIGS. 2 and 3 in order to avoid complication.

Transmit data supplied from a data generator 100 is scrambled at a scrambler 102. The resulting data is then encoded using error correction coding by the encoder 104. The scrambling and encoding methods follow those defined in IEEE 802.11a, for example. Subsequently, the encoded is input into a data distributor 106 and distributed across respective transmit streams.

In each transmit stream, the transmit signal is punctured by a puncturer 108 in accordance with the data rate provided to each stream, and then interleaved by an interleaver 110. The data is then mapped by a mapper 112 into an I-Q signal space made up of in-phase (I) and quadrature-phase (Q) components, thereby resulting in a complex baseband signal. A selector 111 also inserts training sequences at suitable timings into the interleaved transmit signals in each spatial stream, and supplies the result to the mapper 112. The interleaving method may extend that defined in IEEE 802.11a, for example, such that the same interleave is not used among multiple streams. The mapping method also follows IEEE 802.11a, and BPSK, QPSK, 16-QAM, or 64-QAM may be applied thereto.

In a spatial multiplexer 114, a beamforming transmit weight matrix calculator 114a may, for example, estimate respective transfer functions from the training sequences received on each receive branch, the training sequences herein being used to excite the channel matrix. The transmit weight matrix calculator 114a may then use matrix decomposition to assemble a transmit beamforming matrix V from a channel matrix H that was obtained by assembling the above transfer functions. Alternatively, the transmit weight matrix calculator 114a may assemble the transmit beamforming matrix V from CSI data received as a CFB message (as described earlier). Subsequently, a transmit weight matrix multiplier 114b multiplies the above transmit weight matrix V by a transmit vector having respective transmit streams as its elements, thereby performing beamforming on the transmit signal. However, beamforming for the transmit signal is not performed when transmitting a packet containing the training sequence for exciting the channel matrix.

In an inverse fast Fourier transform unit 116, respective sub-carriers arranged in the frequency domain are converted into a time-axis signal, to which guard intervals are added by a guard inserter 118. Subsequently, after being band-limited by a digital filter 120, the signal is converted into an analog signal by a DA converter (DAC) 122. In an RF unit 124, an analog LPF is used to remove all signal components outside the passband. The remaining center frequencies are then upconverted to the RF frequency band, and the signal amplitude is also amplified by power amplification. The transmit signal thus converted to the RF band is then broadcast from the respective transmit antennas.

FIG. 3 illustrates an exemplary configuration of the receiver side of a communication apparatus that conducts MIMO communication. In FIG. 2, the number of antennas in the receiver (or in other words, the number of receive branches) is N. Although the IEEE-compliant maximum of N is 4, for example, only two antenna branches are illustrated in FIGS. 2 and 3 in order to avoid complication.

Data arriving through the channel at the respective receive branches of the receiver are first subjected to analog processing in each receive antenna branch by an RF unit 230.

The analog receive signal is then converted into a digital signal by an AD converter (ADC) 228, and input into a digital filter 226. Subsequently, in a synchronizing circuit 224, processing such as packet discovery, timing detection, frequency offset correction, and noise estimation is conducted.

Figure 4:
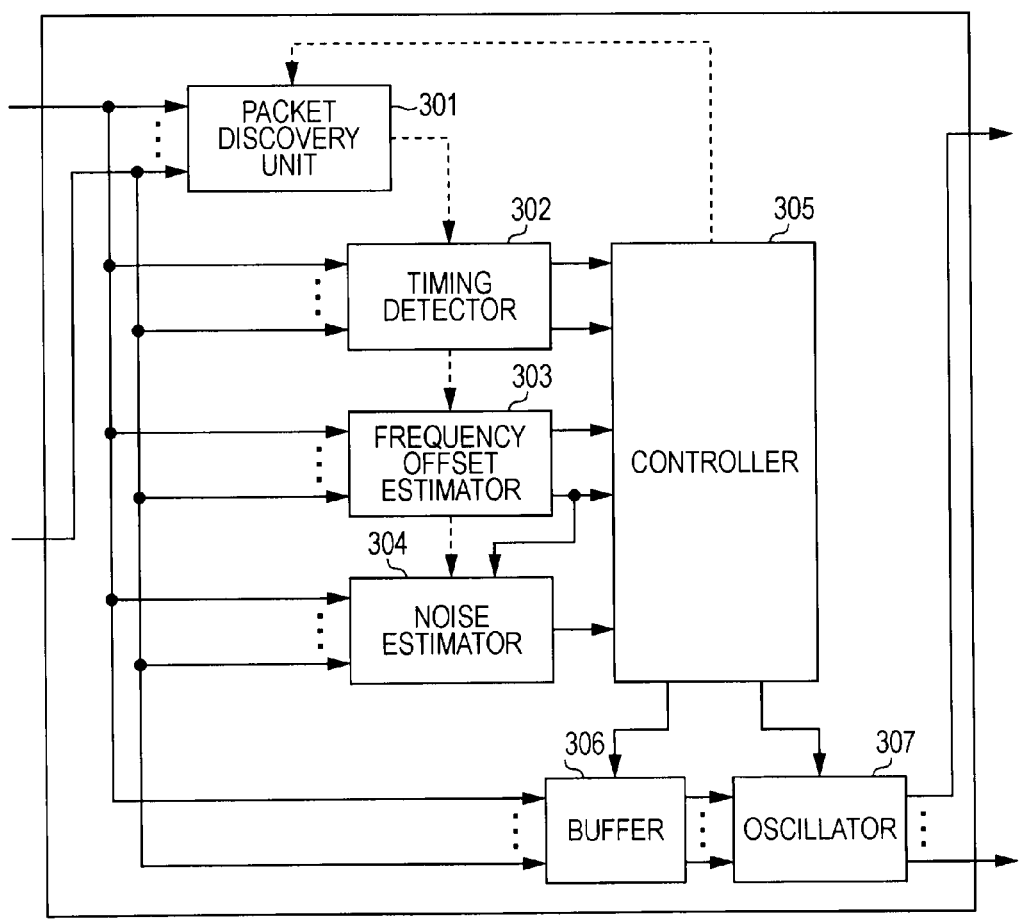
FIG. 4 illustrates an exemplary internal configuration of a synchronizing circuit 224.

FIG. 4 illustrates an exemplary internal configuration of the synchronizing circuit 224. While the receive signals in each branch are buffered in a buffer 306, a packet discovery unit 301 searches for a preamble signal in the packet header. If the packet discovery unit 301 discovers a packet, then a timing detector 302, a frequency offset estimator 303, and a noise estimator 304 use successive segments of the preamble signal to conduct synchronization timing, frequency offset, and noise estimation processing, respectively.

During packet reception, a controller 305 reads receive data samples from the buffer 306 on the basis of the timings detected by the frequency offset estimator 303, applies corrections to an oscillator 307 on the basis of the frequency offset values estimated by the frequency offset estimator 303, and then outputs the result. If the packet discovery unit 301 incorrectly discovers a packet and indices from the respective estimating circuits of the timing detector 302, the frequency offset estimator 303, and the noise estimator 304 fall below reference criteria, then it is determined that a packet does not actually exist. In this case, the controller 305 issues instructions to the packet discovery unit 301, whereby packet searching is once again initiated.

Figure 5:
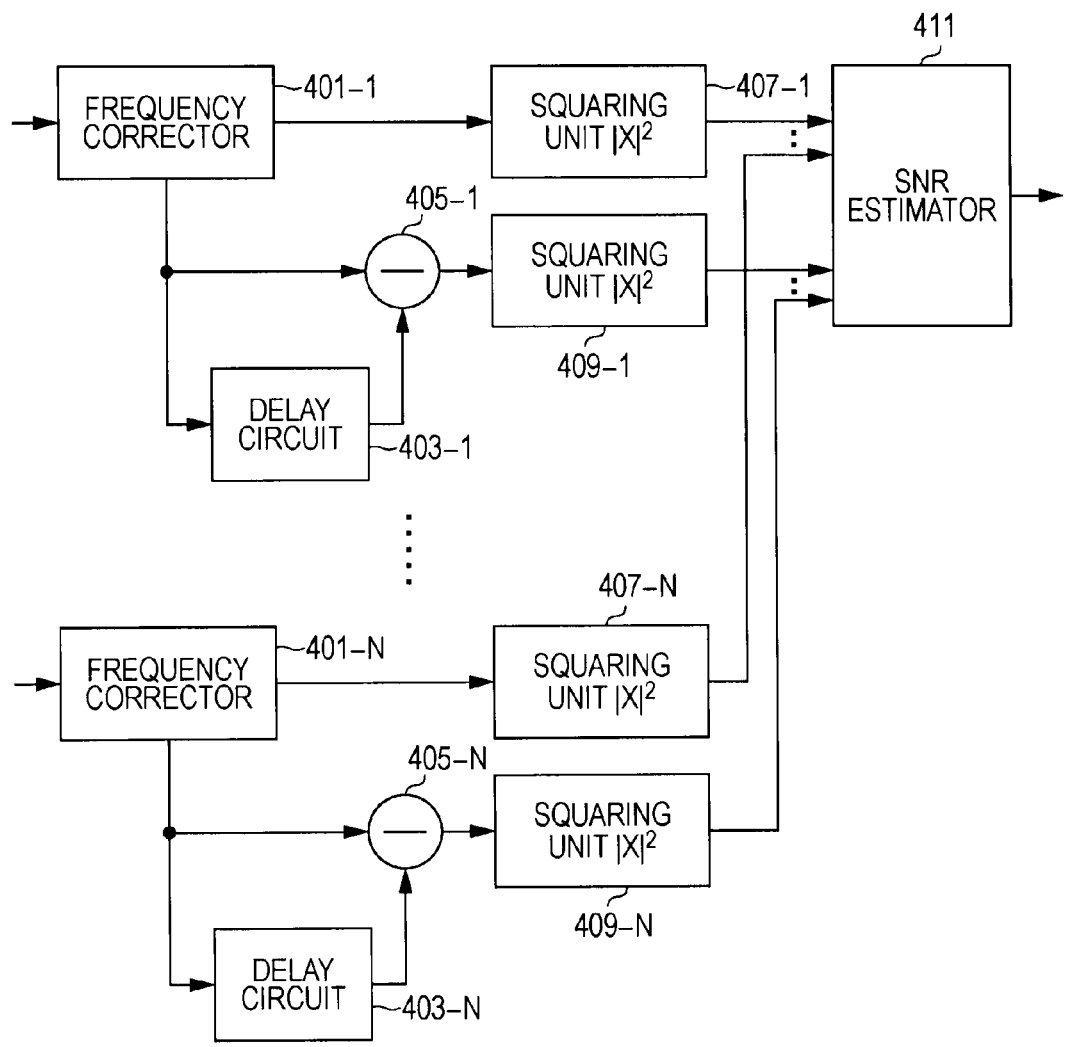
FIG. 5 illustrates an exemplary internal configuration of a noise estimator 304.

FIG. 5 illustrates an exemplary internal configuration of the noise estimator 304. After a frequency corrector 401 corrects frequency offsets in the receive signals in each receive branch, a delay circuit 403 uses the noise-estimating portion of a training sequence made up of repeating, predefined patterns to generate a delay signal matching the repeat period. The noise component is then extracted by taking the difference between repeat periods using a subtractor 405, and then solving for the square of the difference using a squaring unit 409. The squared value of the signal is then computed by another squaring unit 407, and an SNR estimator 411 then estimates the SNR on the basis of the ratio of the above squared values.

The description will now return to FIG. 3 and the configuration of the MIMO receiver. In a guard remover 222, the guard intervals added to the beginning of the data transmit segments are removed. Subsequently, the time-axis signal is converted into a frequency-axis signal by a fast Fourier transform (FFT) unit 220.

In a subsequent calibration processor 218, the receive signals in each receive branch are respectively multiplied by calibration coefficients for correcting phase and amplitude imbalances among the transmit and receive branches, and thus correction of phase and amplitude imbalances existing among the receive branches is realized digitally. The calibration coefficients herein can be solved for using, for example, the method disclosed in Japanese Unexamined Patent Application Publication No. 2007-116489 previously granted to the present applicant. However, it should be appreciated that the present invention is not limited to a particular method for computing calibration coefficients.

In a spatial separator 216, processing is conducted to spatially separate the spatially multiplexed receive signal. More specifically, a channel matrix estimator 216a assembles an estimated channel matrix H from the training sequences received on each receive branch, the training sequences herein being used to excite the channel matrix. The assembled, estimated channel matrix H may also be passed to the beamforming transmit weight matrix calculator 114a at the transmitter as a reverse-direction channel matrix. In addition, an antenna receive weight matrix calculator 216b calculates an antenna receive weight matrix W on the basis of the channel matrix H obtained by the channel matrix estimator 216a. Subsequently, an antenna receive weight matrix multiplier 216c spatially decodes the spatially multiplexed signal by matrix multiplying the antenna receive weight matrix W by a receive vector having respective receive streams as its elements. Independent, per-stream signal sequences are obtained as a result.

Herein, an MMSE algorithm is used as the method for calculating the antenna receive weight matrix W, but obviously a matrix decomposition technique such as SVD or EVD may also be used. Additionally, an MLD receive method can also be applied as another configuration of the spatial separator 216.

A channel equalizing circuit 214 then performs additional offset correction for residual frequencies, channel tracking, and other operations with respect to the per-stream signal sequences. Subsequently, a demapper 212 demaps the receive signal in I-Q signal space, a deinterleaver 210 deinterleaves the receive signal, and a depuncturer 208 depunctures the receive signal at a predetermined data rate.

A data composition unit 206 composites the plurality of receive streams into a single stream. The data composition processing at this point conducts operations that are the exact reverse of the data distribution conducted on the transmit side. After subsequently decoding the stream using error correction decoding by a decoder 204, the stream is descrambled by a descrambler 202, and a data acquisition unit 200 then acquires the receive data.

Figure 6:
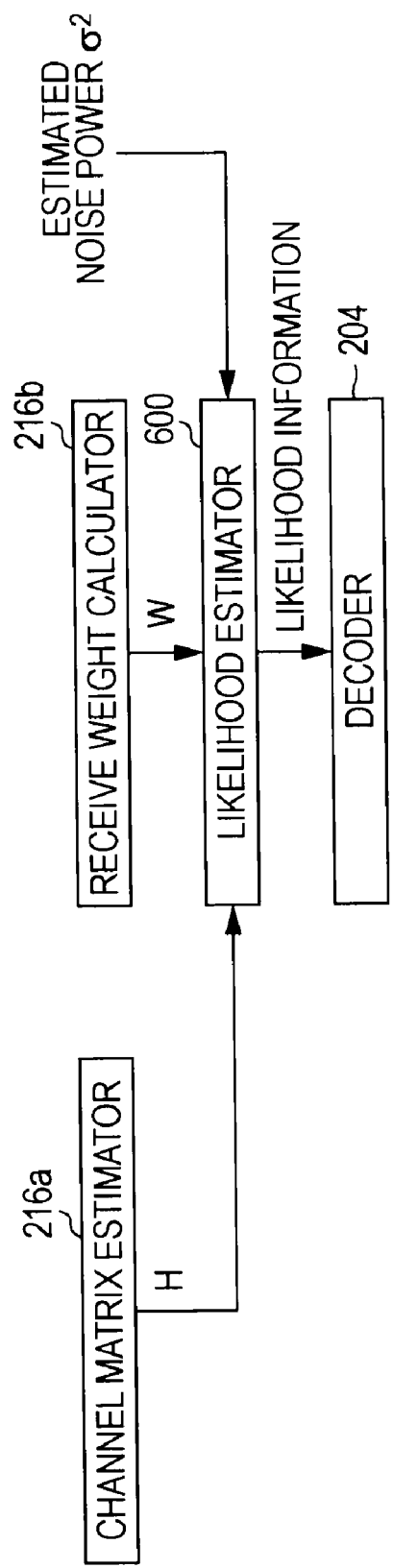
FIG. 6 is a diagram for explaining a structure for providing likelihood information to a decoder 204.

In the decoder 204, soft decision decoding techniques are used to estimate the receive bit sequence by conducting maximum likelihood sequence estimation using methods such as Viterbi decoding. When using such soft decision decoding techniques, some kind of likelihood information is first provided. In a MIMO receiver, an estimated noise power value $\sigma_r^2$ used for MMSE processing (i.e., an estimate value for the noise power contained in the receive signal before spatial decoding) and the estimated channel matrix are used instead of an antenna weight matrix W to directly estimate the noise power, signal power, and interference power in the respective stream signals after spatial decoding. From the above estimated values, the SINR can be solved for. In this case, likelihood amplitude information made up of the square roots of the above values can be used as more reliable high likelihood information in soft decision processing. As shown in FIG. 6, a likelihood estimator 600 takes the following information as input: the channel matrix H estimated by the channel matrix estimator 216a, the antenna receive weight matrix W computed by the receive weight calculator 216b, and the estimated noise power $\sigma_r^2$. The noise power, signal power, and interference power in the respective stream signals after spatial decoding are directly estimated from the above values, and the SINR is then solved for using the estimated values. For further details, see Japanese Unexamined Patent Application Publication No. 2006-279590 previously granted to the present applicant.

Problems associated with the antenna calibration processing conducted in the receiver shown in FIG. 3 will now be considered.

It is difficult to realign the respective phase and amplitude imbalances among the transmit branches and the receive branches. For this reason, antenna calibration accurate enough to perfectly realign the phase and amplitude is not demanded. Consequently, the inventors consider it sufficient to perform calibration processing only during the periods when an information signal important for transmit beamforming is received, such as when receiving a training sequence for exciting the channel matrix.

However, depending on the frame exchange sequence, the time at which the training sequence for exciting the channel matrix arrives from the communication partner may be unknown. For example, in an implicit feedback sequence, a station is able to ascertain the timing at which the communication partner replies with a frame containing a training sequence for exciting the channel matrix, being sent in response to a training sequence transmit request TRQ transmitted by the station itself. In contrast, in an explicit feedback sequence, the timing at which a CSI feedback request is transmitted by the communication partner is unknown. In cases such as the latter, receive signals in each receive branch are continuously multiplied by calibration coefficients.

Multiplying the receive signals in each receive branch by calibration coefficients used to compensate for phase and amplitude imbalances results in the production of invalid gain differences among the branches. Thus, there is concern that such invalid gain differences resulting from inter-branch imbalance correction may affect noise estimation.

For example, when conducting MMSE receiving in a MIMO receiver, a receive weight matrix W is used when spatially separating a spatially multiplexed signal received on respective receive branches, while the average value of the estimated noise values in each receive branch may be used as a reference value. In such case, the noise estimation error produced by invalid gain differences due to multiplication by the calibration coefficients (C(0), C(1), . . . ) leads to degraded reception.

Figure 7:
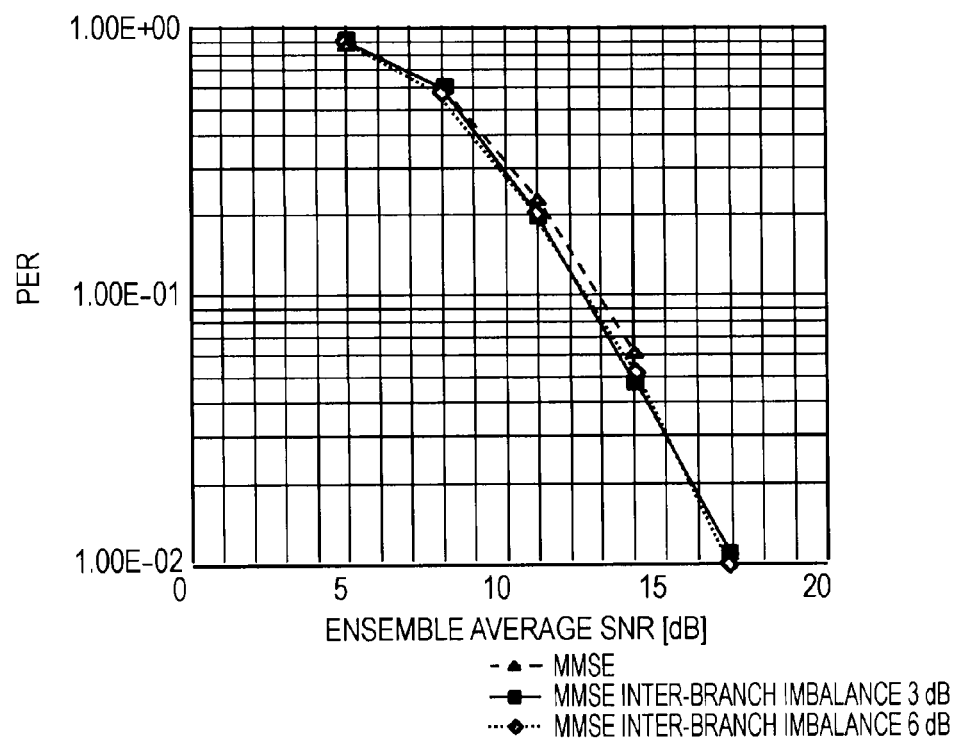
FIG. 7 illustrates evaluation results for characteristics related to effects on noise estimation values due to invalid gain differences among branches.

FIG. 7 illustrates the effects that the estimated noise level exerts on reception when MMSE receiving a 2-stream, spatially multiplexed signal BPSK modulated with a coding rate R=½. The horizontal axis on the graph represents the average SNR [dB], while the vertical axis represents the packet error rate (PER). Change in the packet error rate due to change in the average SNR is plotted for inter-branch imbalances of 0 dB, 3 dB, and 6 dB, respectively. It can thus be seen from FIG. 7 that conducting inter-branch imbalance correction when MMSE receiving causes error in the estimated noise value to affect reception, particularly at low rates.

In addition, some kind of likelihood information is also provided to the decoder when using soft decision decoding methods that estimate the receive bit sequence by conducting maximum likelihood sequence estimation using methods such as deinterleaving and Viterbi decoding. Although likelihood information can be estimated from an estimated channel matrix, an antenna receive weight matrix, and estimated noise power (as described earlier), if error is produced in the antenna receive weight matrix and the estimated noise due to invalid gain differences among branches, then the likelihood information will likewise become inaccurate, and may adversely affect decoding performance.

Figure 8:
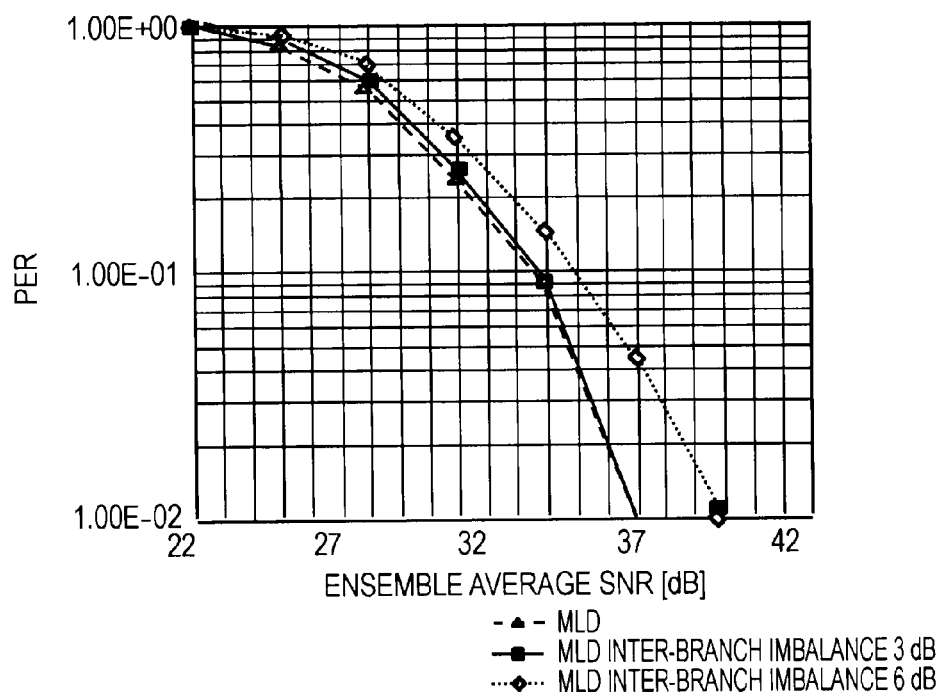
FIG. 8 illustrates evaluation results for characteristics related to effects on likelihood information due to invalid gain differences among branches.

FIG. 8 illustrates the effects that estimated noise level exerts on reception when MLD receiving a 2-stream, spatially multiplexed signal 64-QAM modulated with a coding rate R=⅚. The horizontal axis on the graph represents the average SNR [dB], while the vertical axis represents the packet error rate (PER). Change in the packet error rate due to change in the average SNR is plotted for inter-branch imbalances of 0 dB, 3 dB, and 6 dB, respectively. It can thus be seen from FIG. 8 that conducting inter-branch imbalance correction when MLD receiving causes error in the likelihood information sent to the decoder to affect reception.

FIGS. 7 and 8 also show that large degradation of reception occurs only in cases having extremely large inter-branch imbalances, particularly at 6 dB.

Figure 9:
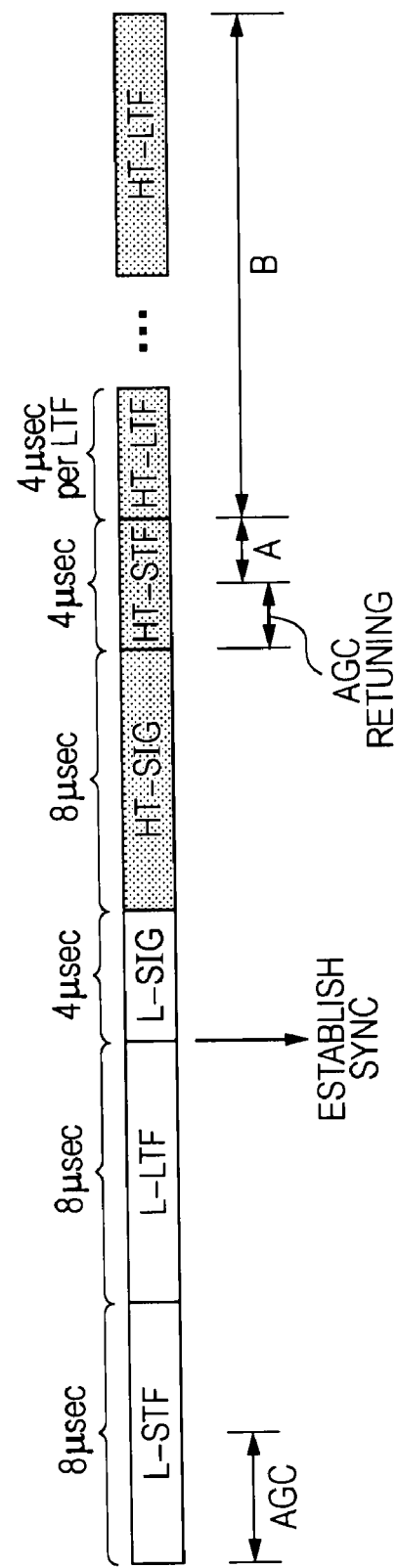
FIG. 9 illustrates a packet format (mixed format) stipulated by IEEE 802.11n, wherein a MIMO-OFDM communication method is adopted.

The packet format (mixed format) stipulated by IEEE 802.11n adopting a MIMO-OFDM communication method and shown in FIG. 9 will now be described by way of example, and the effects that multiplication by calibration coefficients in each receive branch exerts on estimated noise values will be considered.

The header of the packet shown in FIG. 9 includes a legacy preamble having the same format as that of IEEE 802.11a/g, followed by a preamble in a format characteristic to IEEE 802.11n (hereinafter, this format is also referred to as the HT format, and this preamble is also referred to as the HT preamble), as well as a data portion.

The L-STF (legacy short training field) and L-LTF (legacy long training field) portions of the legacy preamble are used for packet discovery, AGC configuration, synchronization, and measurement of carrier frequency error and sampling frequency error between the transmit and receive signals. (In the IEEE 802.11n specification, the carrier frequency error and sampling frequency error can be estimated from the L-STF, L-LTF, HT-STF, and HT-LTF.)

The HT preamble includes an HT-SIG, HT-STF, and HT-LTF. The HT-SIG states information used to interpret aspects of the HT format, such as the transmission method (i.e., the modulation and coding scheme, or MCS) applied to the PHY payload (PSDU), and the data length of the payload. The HT-STF includes a training sequence for improving AGC in the MIMO system. The HT-LTF includes the training sequence used for channel matrix estimation. Depending on the number of streams to be spatially multiplexed, one or more HT-LTF fields may be added.

When conducting MMSE reception in MIMO, the noise in each receive branch is estimated (as described earlier). Furthermore, the noise estimation typically uses the repeating portion of the HT-STF signal preceding the HT-LTF for generating a channel matrix used in spatial separation processing. However, since AGC is retuned in the HT-STF signal segment, the receive gain varies greatly and causes waveform deformation. For this reason, applying an FFT to the HT-STF signal is not desirable.

Consequently, the noise estimation processing uses the repeating portion of the time waveform after applying and locking the AGC retuning of the HT-STF signal. In other words, in the segment labeled A in FIG. 6, noise is estimated by means of time-domain signal processing. In the MIMO receiver shown in FIG. 3, noise estimation is conducted in the synchronizing circuit 224 (see also FIGS. 4 and 5). In contrast, the multiplication for imbalance correction is conducted as frequency-domain signal processing in the segment starting at the HT-LTF and labeled B in FIG. 6. In the MIMO receiver shown in FIG. 3, the frequency-domain receive signal output from the fast Fourier transform (FFT) unit 220 is multiplied by calibration coefficients in the subsequent calibration processor 218.

Consequently, when averaging the inter-branch estimated noise values ($N_0, N_1, \ldots, N_n$), the gain ($C(0), C(1), \ldots C(n)$) is not applied by the inter-branch imbalance correction, and thus there is a problem when using the average inter-branch noise level $N_{avg}$ as the MMSE reference value for MMSE.

As described above, the gain differences produced among branches as a result of multiplying by calibration coefficients in each receive branch are invalid, and such gain differences also affect the channel matrix used for subsequent likelihood information generation.

Given the above, it is preferable to conduct one of the following methods.

(1) If antenna calibration is to be continuously executed, then a final estimated value (X) is derived that takes the multiplication by correction coefficients into account when averaging the estimated values ($x_0, x_1, \ldots, x_n$) for each receive branch or when computing a weighted average according to likelihood.

Depending on the frame exchange sequence, the time at which a frame containing the training sequence for exciting the channel matrix arrives from the communication partner may be unknown (as described earlier). In such cases, the receive signals in each receive branch are continuously multiplied by calibration coefficients. Consequently, when digitally correcting phase and amplitude imbalances among respective transmit and receive RF branches, the ratio of the output among the receive branches varies according to the imbalance correction values. Thus, in order to prevent error in the estimated values (i.e., the channel waveform equalization values, the noise power estimations, and the likelihood information) found before and after execution of imbalance correction, a final estimated value (X) that takes the multiplication by correction coefficients into account is derived when averaging the various estimated values ($x_0, x_1, \ldots, x_n$) for each receive branch or when computing a weighted average according to likelihood.

(2) If antenna calibration is to be continuously executed, then a channel matrix H1 (multiplied by calibration coefficients) and a channel matrix H2 (not multiplied by calibration coefficients) are prepared. The channel matrix H1 is then used when solving for the transmit beamforming matrix V, while the channel matrix H2 is used for all other applications.

Figure 10:
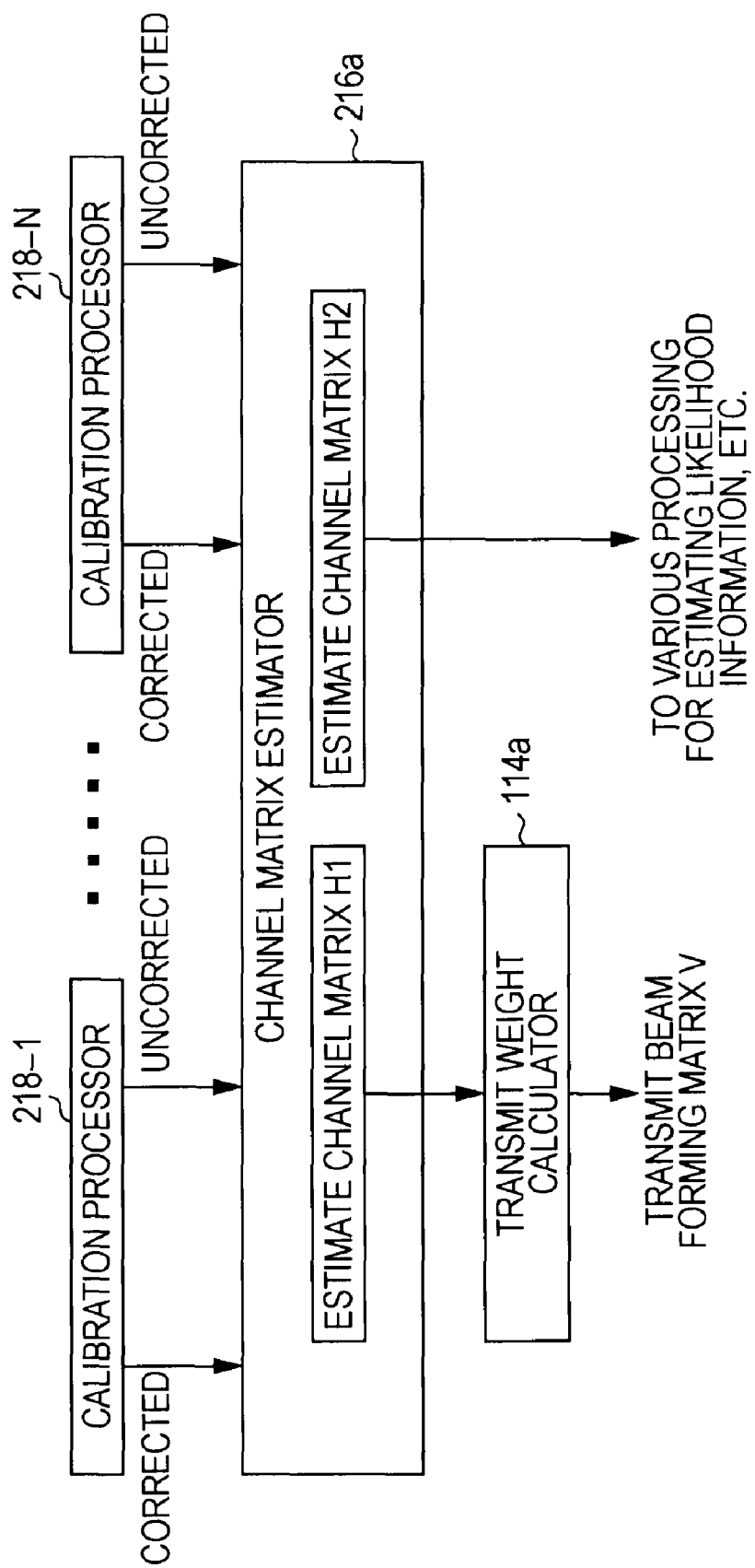
FIG. 10 is a diagram for explaining a structure wherein a channel matrix H1 multiplied by calibration coefficients and a channel matrix H2 not multiplied by calibration coefficients are prepared, and wherein the channel matrix H1 is used when solving for a transmit beamforming matrix V, with the channel matrix H2 being used for all other cases.

In this case, the calibration processor 218 disposed in each receive branch is configured to pass both receive signals multiplied by calibration coefficients and receive signals not multiplied by calibration coefficients to the subsequent channel matrix estimator 216a (see FIG. 10). The channel matrix estimator 216a then estimates the channel matrix H1 using a transfer function that has been multiplied by the calibration coefficients, while additionally solving for a channel matrix H2 using a transfer function that has not been multiplied by the calibration coefficients. The channel matrix H1 that has been multiplied by calibration coefficients is then passed from the channel matrix estimator 216a to the transmit weight calculator 114a, and then used to estimate the transmit beamforming matrix V.

Furthermore, since estimation of the likelihood information and other quantities is conducted using the channel matrix H2 that was obtained without applying invalid gain differences, estimation error is curtailed. In other words, although the ratio of the output among the receive branches varies according to the imbalance correction values when digitally correcting phase and amplitude imbalances among respective transmit and receive RF branches, the apparatus is configured such that error in the estimated values (i.e., the channel waveform equalization values, the noise power estimations, and the likelihood information) found before and after execution of imbalance correction is not produced.

(3) Antenna calibration is conducted only when the apparatus is standing by to receive a packet used for antenna calibration.

When digitally correction phase and amplitude imbalances among respective transmit and receive RF branches, the ratio of the output among the receive branches varies according to the imbalance correction values. Thus, in order to prevent error in the estimated values (i.e., the channel waveform equalization values, the noise power estimations, and the likelihood information) found before and after execution of imbalance correction, antenna calibration is only conducted when the apparatus is standing by to receive a packet used for antenna calibration.

Figure 11:
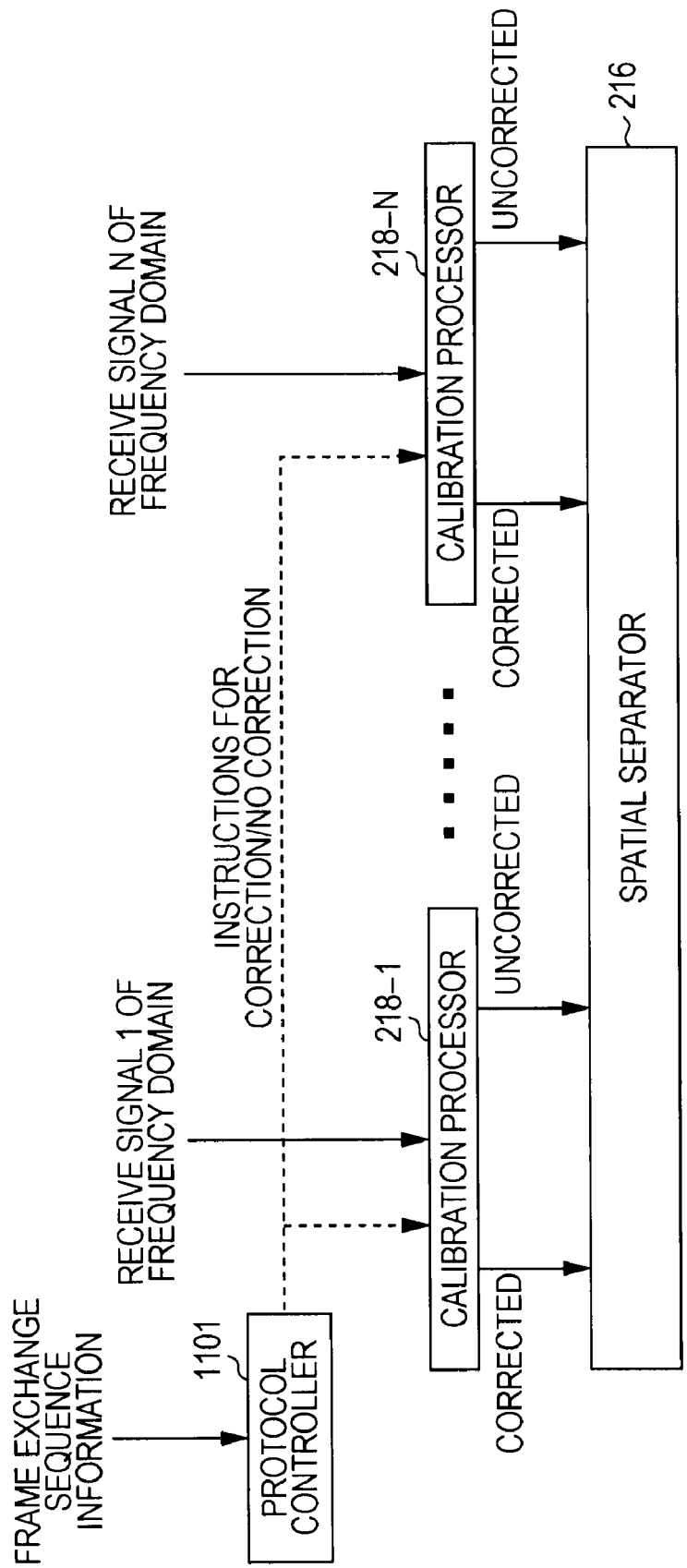
FIG. 11 is a diagram for explaining a structure for controlling antenna calibration processing in accordance with the packet receive state.

FIG. 11 illustrates a structure for controlling antenna calibration processing in accordance with the packet receive state. A protocol controller 1101 ascertains the frame exchange sequence currently being carried out with the communication partner. Subsequently, when the apparatus transitions to a standby state for receiving a packet used for antenna calibration, the protocol controller 1101 responds by issuing instructions to the calibration processor 218 to pass receive signals multiplied by the calibration coefficients to the subsequent spatial separator 216. In addition, when the apparatus transitions out of the standby state for receiving a packet used for antenna calibration, the protocol controller 1101 issues instructions to the calibration processor 218 to pass receive signals not multiplied by calibration coefficients to the subsequent spatial separator 216.

Since likelihood information and other quantities are estimated using a channel matrix H obtained without applying invalid gain differences during all periods except the period during which a channel matrix for the transmit beamforming matrix V is estimated in the spatial separator 216, estimation error in the likelihood information is curtailed.

(4) Alternatively, in order to ascertain in advance the standby state for receiving a packet used for antenna calibration, the apparatus may be configured to itself control the response packet transmit opportunity for obtaining a channel matrix H used to estimate the transmit beamforming matrix. The apparatus conducts control such that antenna calibration is conducted only when standing by to receive a packet used for antenna calibration.

Depending on the frame exchange sequence, it may thus be possible to ascertain when the communication partner replies with a frame containing a training sequence for exciting the channel matrix.

(4-1) Controlling phase and amplitude imbalance correction when acquiring the transmit beamforming matrix For example, IEEE 802.11n stipulates a frame exchange sequence wherein the beamformer first issues a training request (TRQ) requesting transmission of a training sequence, and in response, the beamformer replies with a frame containing a training sequence for exciting the channel matrix. Consequently, by transmitting a packet containing a TRQ to the communication partner, the communication apparatus is able to control when the communication partner replies with a frame containing a training sequence for exciting the channel matrix.

The protocol controller 1101 first ascertains the frame exchange sequence currently being carried out. Subsequently, the transmitter transmits a packet containing a TRQ to the communication partner and transitions to a standby state for receiving a packet containing a training sequence for exciting the channel matrix (or in other words, a packet used for antenna calibration). The protocol controller 1101 then issues instructions to the calibration processor 218 in each receive branch to pass receive signals multiplied by the calibration coefficients to the subsequent spatial separator 216.

The channel matrix estimator 216a in the spatial separator 216 receives the receive signals multiplied by calibration coefficients from the calibration processor 218 in each branch, and is thus able to acquire a suitable transmit beamforming matrix V.

In addition, when the apparatus transitions out of the standby state for receiving a packet used for antenna calibration, the protocol controller 1101 issues instructions to the calibration processor 218 to pass receive signals not multiplied by calibration coefficients (i.e., receive signals not corrected for phase and amplitude imbalances) to the subsequent spatial separator 216.

Since likelihood information and other quantities are estimated using a channel matrix H obtained without applying invalid gain differences during all periods other than the period during which a channel matrix for the transmit beamforming matrix V is estimated in the spatial separator 216, estimation error in the likelihood information is curtailed.

(4-2) Controlling Phase and Amplitude Imbalance Correction for Link Adaptation

In addition, IEEE 802.11n stipulates the following two sequences, for example, for conducting link adaptation to adaptively control the modulation and coding scheme (MCS) between communication stations.

First method: in a single transmission opportunity (TXOP), the station corresponding to the responder transmits link adaptation feedback containing the recommended MCS (i.e., MCS feedback, or MFB) to the station acting as the initiator.

Second method: in response to receiving a packet containing an MCS request (MRQ) from the communication partner, the station replies with link adaptation feedback (MFB) at the next transmission opportunity (TXOP).

When carrying out link adaptation, the communication apparatus conducts phase and amplitude imbalance correction with respect to the receive signals in each receive branch. Consequently, the protocol controller 1101 that ascertains the frame exchange sequence currently being carried out instructs the calibration processor 218 in each receive branch to conduct antenna calibration when link adaptation feedback (MFB) is expected from the communication partner in the first method, or in response to receiving a packet containing an MCS request (MRQ) from the communication partner in the second method. As a result, suitable link adaptation can be carried out using receive signals that have been corrected for phase and amplitude imbalances.

Subsequently, when link adaptation is completed, the protocol controller 1101 instructs the calibration processor 218 in each receive branch to output receive signals not multiplied by calibration coefficients (i.e., receive signals not corrected for phase and amplitude imbalances).

The present application contains subject matter related to that disclosed in Japanese Priority Patent Application JP 2008-182792 filed in the Japan Patent Office on Jul. 14, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication apparatus, comprising:
a plurality of transmit antennas and receive antennas;
a transmit branch for each transmit antenna as well as a receive branch for each receive antenna;
a calibration processor configured to multiply receive signals in each receive branch by antenna calibration coefficients, in order to correct phase and amplitude imbalances existing among the receive branches;
a transmit beamforming matrix estimator configured to estimate a transmit beamforming matrix by using the respective receive signals that were multiplied by the antenna calibration coefficients by the calibration processor; and
an estimator configured to estimate the noise power, likelihood information, and channel waveform equalization values for each receive branch or other estimated values, and in addition, to derive a final estimated value that takes the multiplication by correction coefficients into account when averaging the estimated values for each receive branch or when computing a weighted average according to likelihood.

2. A wireless communication apparatus, comprising:
a plurality of transmit antennas and receive antennas;
a transmit branch for each transmit antenna as well as a receive branch for each receive antenna;
a calibration processor configured to multiply receive signals in each receive branch by antenna calibration coefficients, in order to correct phase and amplitude imbalances existing among the receive branches;
a channel matrix estimator configured to estimate a first channel matrix by using respective receive signals multiplied by the antenna calibration coefficients by the calibration processor, as well as to estimate a second channel matrix by using respective receive signals not multiplied by the antenna calibration coefficients by the calibration processor;
a transmit beamforming matrix estimator configured to estimate a transmit beamforming matrix by using the first channel matrix; and
an estimator configured to use the second channel matrix to estimate the noise power, likelihood information, and channel waveform equalization values for each receive branch, or conduct other processing.

3. A wireless communication apparatus, comprising:
a plurality of transmit antennas and receive antennas;
a transmit branch for each transmit antenna as well as a receive branch for each receive antenna;
a calibration processor configured to multiply receive signals in each receive branch by antenna calibration coefficients, in order to correct phase and amplitude imbalances existing among the receive branches;
a controller configured to ascertain the frame exchange sequence being carried out with the communication partner, and conduct control such that the calibration processor performs antenna calibration only when the apparatus is standing by to receive a packet used for antenna calibration;
a channel matrix estimator configured to estimate a channel matrix by using respective receive signals;
a transmit beamforming matrix estimator configured to estimate a transmit beamforming matrix by using the channel matrix; and
an estimator configured to use the channel matrix to estimate the noise power, likelihood information, and channel waveform equalization values for each receive branch, or conduct other processing.

4. The wireless communication apparatus in accordance with claim 3, wherein
the controller itself controls the response packet transmit opportunity in order to obtain a channel matrix H used to estimate a transmit beamforming matrix.

5. The wireless communication apparatus in accordance with claim 4, wherein
when the apparatus is in a receive standby state after requesting the communication partner for transmission of a frame containing a training sequence for exciting the channel matrix, the controller issues instructions such that the calibration processor conducts antenna calibration.

6. The wireless communication apparatus according to claim 4, wherein
when the apparatus carries out link adaptation and is in a receive standby state after receiving a link adaptation feedback request from the communication partner, the controller issues instructions such that the calibration processor conducts antenna calibration.

7. A wireless communication method implemented in a wireless communication apparatus provided with a plurality of transmit antennas and receive antennas, a transmit branch for each transmit antenna, as well as a receive branch for each receive antenna, the method comprising the steps of:
calibrating by multiplying the receive signals in each receive branch by antenna calibration coefficients in order to correct phase and amplitude imbalances existing among the receive branches;
estimating a transmit beamforming matrix by using the respective receive signals multiplied by the antenna calibration coefficients in the calibrating step; and
estimating by solving for the noise power, likelihood information, and channel waveform equalization values for each receive branch or other estimated values, and in addition, deriving a final estimated value that takes the multiplication by correction coefficients into account when averaging the estimated values for each receive branch or when computing a weighted average according to likelihood.

8. A wireless communication method implemented in a wireless communication apparatus provided with a plurality of transmit antennas and receive antennas, a transmit branch for each transmit antenna, as well as a receive branch for each receive antenna, the method comprising the steps of:
calibrating by multiplying the receive signals in each receive branch by antenna calibration coefficients in order to correct phase and amplitude imbalances existing among the receive branches;
estimating a first channel matrix by using respective receive signals that were multiplied by the antenna calibration coefficients in the calibrating step;
estimating a second channel matrix by using respective receive signals not multiplied by the antenna calibration coefficients in the calibrating step;
estimating a transmit beamforming matrix by using the first channel matrix; and
estimating the noise power, likelihood information, and channel waveform equalization values for each receive branch, or conducting other processing, using the second channel matrix.

9. A wireless communication method implemented in a wireless communication apparatus provided with a plurality of transmit antennas and receive antennas, a transmit branch for each transmit antenna, as well as a receive branch for each receive antenna, the method comprising the steps of:
calibrating by multiplying receive signals in each receive branch by antenna calibration coefficients, in order to correct phase and amplitude imbalances existing among the receive branches, wherein the calibrating is only conducted when the apparatus is standing by to receive a packet used for antenna calibration;
estimating a channel matrix by using respective receive signals;
estimating a transmit beamforming matrix by using the channel matrix; and
estimating the noise power, likelihood information, and channel waveform equalization values for each receive branch, or conducting other processing, using the channel matrix.

10. A computer program embodied in a non-transitory computer readable medium so as to cause the execution of processing, on a computer, in a wireless communication apparatus provided with a plurality of transmit antennas and receive antennas, a transmit branch for each transmit antenna, as well as a receive branch for each receive antenna, the computer program causing the computer to execute the steps of:
calibrating by multiplying the receive signals in each receive branch by antenna calibration coefficients in order to correct phase and amplitude imbalances existing among the receive branches;
estimating a transmit beamforming matrix by using the respective receive signals multiplied by the antenna calibration coefficients in the calibrating step; and
estimating by solving for the noise power, likelihood information, and channel waveform equalization values for each receive branch or other estimated values, and in addition, deriving a final estimated value that takes the multiplication by correction coefficients into account when averaging the estimated values for each receive branch or when computing a weighted average according to likelihood.

11. A computer program embodied in a non-transitory computer readable medium so as to cause the execution of processing, on a computer, in a wireless communication apparatus provided with a plurality of transmit antennas and receive antennas, a transmit branch for each transmit antenna, as well as a receive branch for each receive antenna, the computer program causing the computer to execute the steps of:
calibrating by multiplying the receive signals in each receive branch by antenna calibration coefficients in order to correct phase and amplitude imbalances existing among the receive branches;
estimating a first channel matrix by using respective receive signals that were multiplied by the antenna calibration coefficients in the calibrating step;
estimating a second channel matrix by using respective receive signals not multiplied by the antenna calibration coefficients in the calibrating step;
estimating a transmit beamforming matrix by using the first channel matrix; and
estimating the noise power, likelihood information, and channel waveform equalization values for each receive branch, or conducting other processing, using the second channel matrix.

12. A computer program embodied in a non-transitory computer readable medium so as to cause the execution of processing, on a computer, in a wireless communication apparatus provided with a plurality of transmit antennas and receive antennas, a transmit branch for each transmit antenna, as well as a receive branch for each receive antenna, the computer program causing the computer to execute the steps of:

calibrating by multiplying receive signals in each receive branch by antenna calibration coefficients, in order to correct phase and amplitude imbalances existing among the receive branches, wherein the calibrating is only conducted when the apparatus is standing by to receive a packet used for antenna calibration;

estimating a channel matrix by using respective receive signals;

estimating a transmit beamforming matrix by using the channel matrix; and estimating the noise power, likelihood information, and channel waveform equalization values for each receive branch, or conducting other processing, using the channel matrix.

* * * * *